(12) United States Patent
Newman et al.

(10) Patent No.: US 8,287,740 B2
(45) Date of Patent: Oct. 16, 2012

(54) APPARATUS FOR EXTRACTING MATERIAL FROM LIQUID AND METHODS THEREFOR

(75) Inventors: Howard W. Newman, Klamath Falls, OR (US); John Lowell Bowers, Klamath Falls, OR (US); Jordan D. Jones, Keno, OR (US)

(73) Assignee: Desert Lake Technologies, LLC, Klamath Falls, OR (US)

( * ) Notice: Subject to any disclaimer, the term of this patent is extended or adjusted under 35 U.S.C. 154(b) by 209 days.

(21) Appl. No.: 12/637,698

(22) Filed: Dec. 14, 2009

(65) Prior Publication Data

US 2010/0147782 A1 Jun. 17, 2010

Related U.S. Application Data

(60) Provisional application No. 61/201,902, filed on Dec. 15, 2008.

(51) Int. Cl.
*A01D 44/00* (2006.01)
*A01G 33/00* (2006.01)
*E02B 15/04* (2006.01)

(52) U.S. Cl. ................ 210/747.5; 210/776; 210/170.11; 210/242.1; 47/1.4; 56/9

(58) Field of Classification Search ............... 210/747.2, 210/747.3, 776, 170.05, 170.09, 170.1, 170.11, 210/242.1, 242.3; 47/1.4; 56/8, 9
See application file for complete search history.

(56) References Cited

U.S. PATENT DOCUMENTS

| | | | | |
|---|---|---|---|---|
| 1,076,483 A * | 10/1913 | Collar | ......................... | 210/156 |
| 3,314,540 A * | 4/1967 | Lane | ............................ | 210/776 |
| 3,314,545 A * | 4/1967 | Grabbe et al. | ............ | 210/242.3 |
| 4,138,340 A * | 2/1979 | Suzuki et al. | ................. | 210/923 |
| 4,165,282 A * | 8/1979 | Bennett et al. | ............ | 210/242.3 |
| 5,028,325 A * | 7/1991 | Hamilton | ................... | 210/242.1 |
| 5,457,908 A * | 10/1995 | Sanders | ............................. | 56/9 |
| 5,593,579 A * | 1/1997 | Reynolds | .................. | 210/242.1 |
| 2007/0158253 A1* | 7/2007 | Kellett | ....................... | 210/242.1 |
| 2010/0147781 A1* | 6/2010 | Newman et al. | ............. | 210/776 |

\* cited by examiner

*Primary Examiner* — Christopher Upton
(74) *Attorney, Agent, or Firm* — Klarquist Sparkman, LLP

(57) ABSTRACT

Apparatus for extracting a material from a body of liquid and methods therefore are disclosed. A transport member comprises at least one continuous loop configured to pass through a continuous orbit. The material sufficiently adheres to at least a portion of the at least one continuous loop. A scraping member urges against at least a portion of the continuous loop for removing at least some of any of the material adhered to the continuous loop. Such an apparatus can be a harvester that includes a frame having a first end and a second end. A first conveyor drum can be supported by the frame adjacent the first end and can have an outer surface for engaging the transport member. A second conveyor drum can be supported adjacent the second end and can have an outer surface for engaging the transport member. The at least one continuous loop can extend between the first conveyor drum and the second conveyor drum and frictionally engage at least a portion of each respective outer surface of the first conveyor drum and the second conveyor drum.

12 Claims, 6 Drawing Sheets

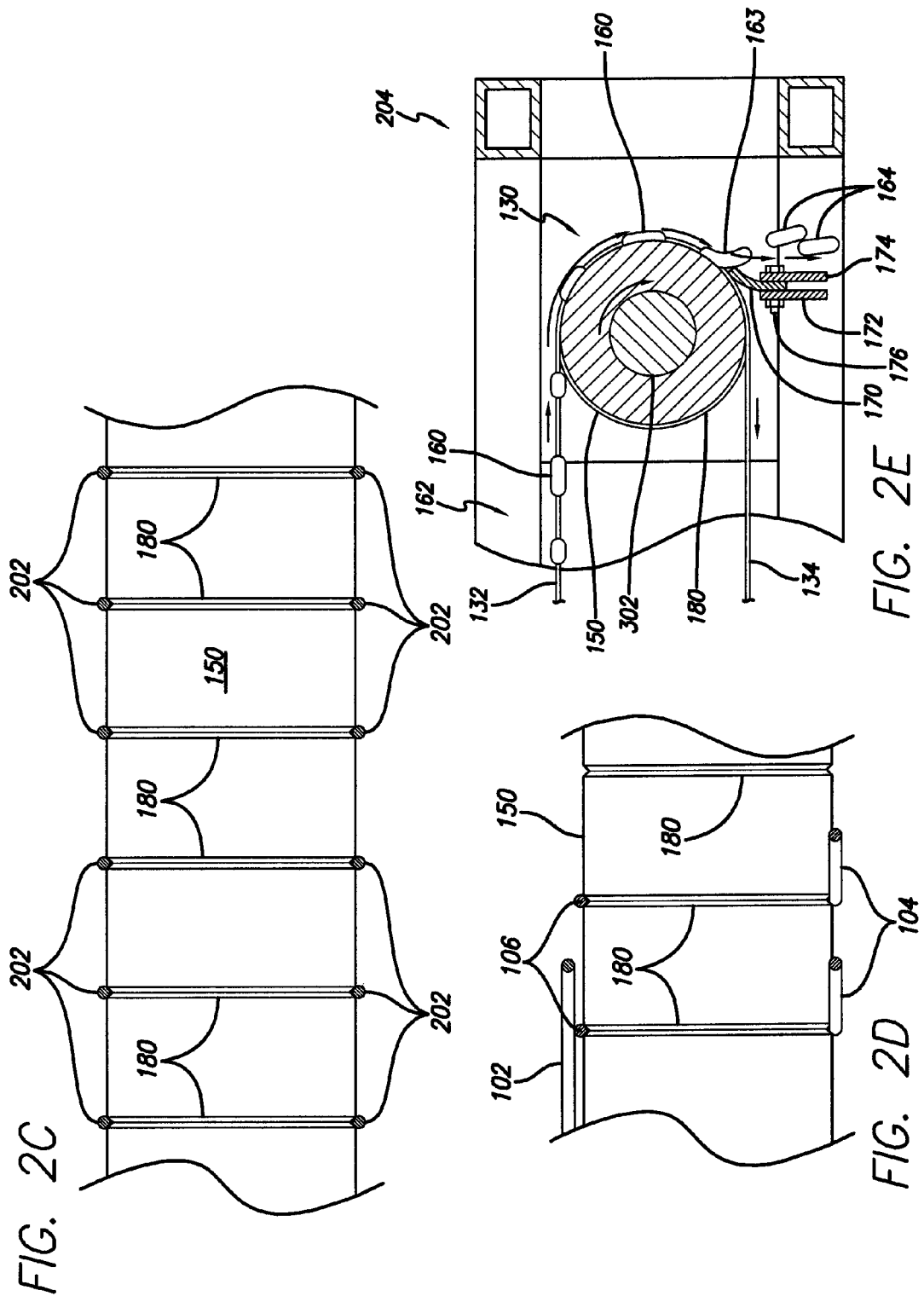

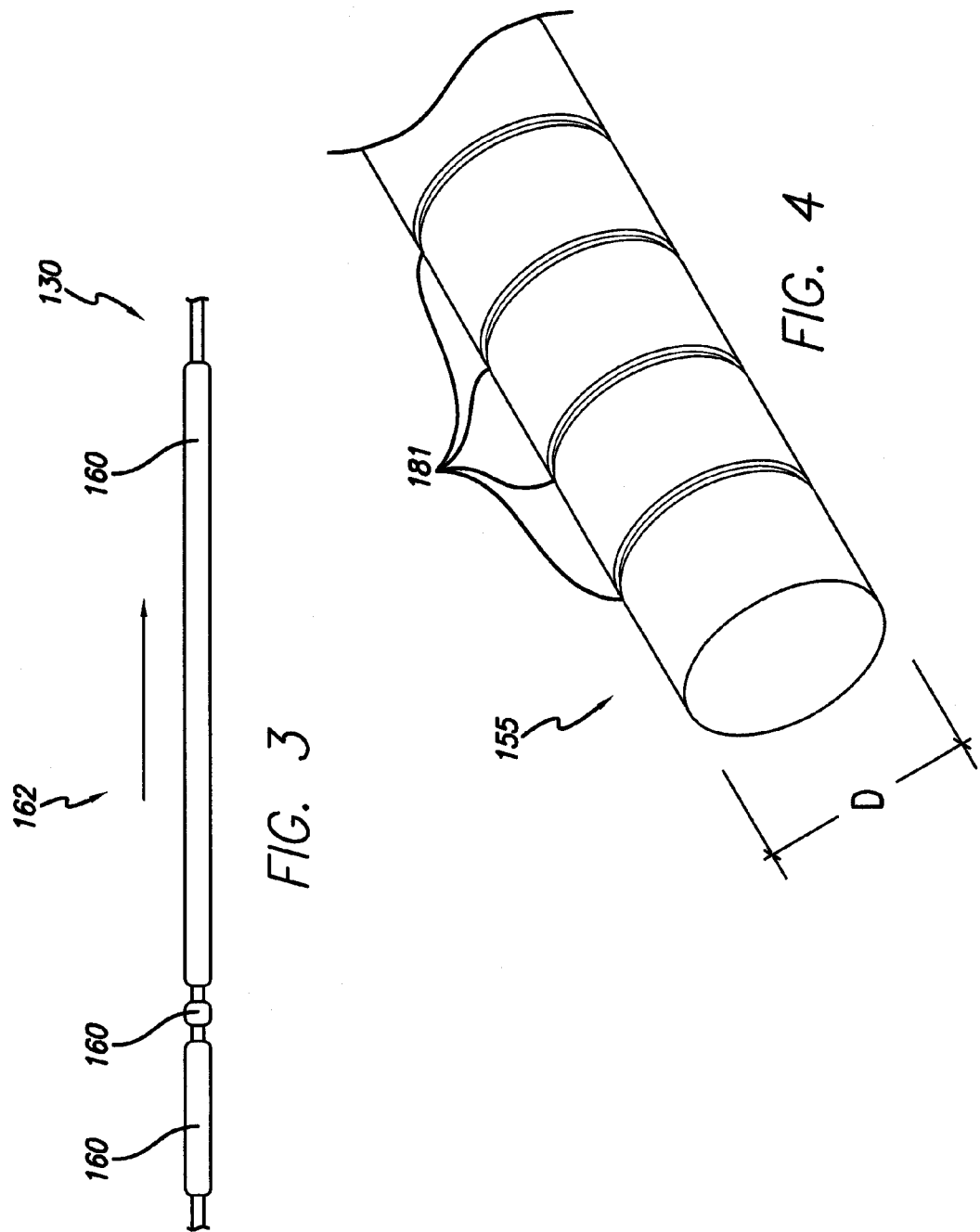

APPARATUS FOR EXTRACTING MATERIAL FROM LIQUID AND METHODS THEREFOR

CROSS REFERENCE TO RELATED APPLICATION

This application claims priority to and the benefit of U.S. provisional patent application No. 61/201,902, filed Dec. 15, 2008, which provisional application is incorporated herein in its entirety.

FIELD

This disclosure relates to apparatus for, and methods of, extracting material from a body of liquid, such as, for example, extracting algae or surface contaminants from a body of liquid, with selectively extracting strands of *Aphanizomenon flos-aquae* (AFA) from a body of water being but one example.

BACKGROUND

Material has been extracted from bodies of liquid for decades, if not centuries. For example, people have collected seaweed and algae from bodies of water, as well as surface contaminants from vats of industrial chemicals and oil spills from oceans.

For the past three decades or so, blue-green algae, such as *Aphanizomenon flos aquae* (AFA), have been used as a source of various nutritional and health supplements. During this time, AFA has been harvested using conventional techniques and subsequently dried and packed for direct consumption, or encapsulated or put into tablet form as a dietary supplement.

Conventional techniques for extracting material from liquid include using screens to strain the material, e.g., blue-green algae held in suspension, from gravity-driven and/or pumped flows in irrigation canals. Another conventional technique has been to drag "drapers" with screens through a body of water to strain suspended blue-green algae (or oil from a spill) from the water.

Each of these conventional methods is non-selective in extracting material. When used to extract blue-green algae, undesirable biomass is often extracted along with the blue-green algae. Consequently, these methods work well for collecting blue-green algae for consumption only to the extent the blue-green algae is the only, or at least the dominant, biomass in the region of the body of water from which the blue-green algae is being harvested. Usually, however, other algae species or zooplankton are present in the region. Thus, these conventional harvesting techniques often lead to undesirable contaminants in the extracted material. For example, these conventional and non-selective techniques can inadvertently extract fish, such as endangered fish, or fish that quickly decay and contaminate the blue-green algae.

SUMMARY

Apparatus for and methods of extracting a material from a body of liquid are disclosed. Embodiments of the disclosed apparatus comprise a transport member comprising at least one continuous loop configured to pass through a continuous orbit. Transport members as described herein can comprise a plurality of continuous loops. In operation, the transport member is at least partially submerged in the body of liquid and material sufficiently adheres to at least a portion of the transport member. A scraping member urges against the transport member for removing at least some of the material adhered to the continuous loop.

The disclosed apparatus can include a frame having a first end and a second end. Conveyor drums can be supported by the frame and can have an outer surface for engaging the transport member. For example, a first conveyor drum can be supported by the frame adjacent the first end, and a second conveyor drum can be supported by the frame adjacent the second end. The transport member can extend between the first conveyor drum and the second conveyor drum and, in some embodiments, can frictionally engage at least a portion of each respective outer surface of the first conveyor drum and the second conveyor drum.

The material can be a blue-green algae, with *Aphanizomenon flos aquae* (AFA) being an example. Some embodiments of the apparatus can be used to selectively harvest AFA.

Embodiments of the apparatus can comprise one or more drives for driving one or more of the conveyor drums in rotation. In these embodiments, the first conveyor drum can frictionally drive the transport member. The second conveyor drum can comprise an idler drum.

Each respective conveyor drum can define a characteristic length, such as a chord length, a diameter, a hydraulic diameter, etc. As used herein, "characteristic length" means a length along at least one dimension of a physical object having an arbitrary shape about which some physical behavior of the object can be scaled. For example, a characteristic length of a cylinder can be a cross-sectional diameter of the cylinder, a characteristic length of a body having a square cross-sectional area can be a length of one side of the square, and a characteristic length of a foil, such as an airfoil or a hydrofoil, can be a chord length. As used herein, "diameter" means (1) a straight line segment passing through a circle's center point and terminating at the circle's circumference on each end or (2) a length of such a line segment. As used herein, "hydraulic diameter" means the diameter of a hypothetical circular body having substantially the same physical behavior or effect as an actual body having an arbitrary shape.

In some embodiments, a characteristic length of the first conveyor drum can be about twice a characteristic length of a second conveyor drum. For example, the characteristic length of the first conveyor drum can be range from about one-and-a-half times to about three times the characteristic length of the second drum. At least one of the first conveyor drum and the second conveyor drum can define a circumferentially extending groove for aligning the transport member. In some embodiments, one or more conveyor drums have an external shape being configured for passing through a fluid and having a desired downstream wake, such as a hydrofoil configured to reduce separation or wake turbulence aft of the hydrofoil when submerged.

In some embodiments, the first conveyor drum and the second conveyor drum can define respective longitudinal axes-of-rotation being substantially parallel to each other. The scraping member can comprise a body positioned substantially radially relative to one of the first conveyor drum and the second conveyor drum. The body can extend substantially parallel to the longitudinal axis-of-rotation of the corresponding one of the first conveyor drum and the second conveyor drum.

The at least one continuous loop can comprise a single winding. The at least one continuous loop can comprise a serpentine winding.

The frame can be configured to pivotably mount to a platform. For example, the frame can be configured to at least partially submerge one of the first conveyor drum and the second conveyor drum in the body of liquid when the frame is pivotably mounted to the platform. The platform can comprise one of a mobile platform and a stationary platform.

Methods of extracting a material, e.g., blue-green algae, from a body of liquid are also disclosed. Such methods comprise the act of at least partially submerging in a body of liquid a portion of a transport member configured to interact with the material and to continuously travel through an orbit. The submerged portion of the transport member can be passed through a concentration of the material in the body of liquid. The submerged portion of the transport member can be lifted from the body of liquid and any material adhered to the transport member can be removed.

In some instances, the act of passing the submerged portion of the transport member through a concentration of the material comprises moving the submerged portion of the transport member through the body of liquid containing the material. In other instances, the act of passing the submerged portion of the transport member through a concentration of the material comprises positioning the submerged portion of the transport member in a current within the body of liquid containing the material and allowing the current to pass the submerged portion of the transport member. In some instances, at least a portion of the transport member can be submerged to a depth of up to about eight feet below a free surface of the body of liquid.

The foregoing and other features and advantages will become more apparent from the following detailed description, which proceeds with reference to the accompanying drawings.

BRIEF DESCRIPTION OF THE DRAWINGS

FIG. 2C illustrates a partial cross-sectional view along line 2C-2C of FIG. 2B.

FIG. 2D illustrates a partial cross-sectional view along line 2D-2D of FIG. 2A.

FIG. 2E illustrates a cross-sectional view along line 2E-2E of FIG. 2A.

FIG. 3 illustrates a side view of a portion of a strand partially forming a transport member having material extracted from a body of liquid adhered thereto.

FIG. 4 illustrates a partial isometric view of an embodiment of a conveyor drum having grooves for guiding a transport member.

DETAILED DESCRIPTION

The following describes embodiments of apparatus for and methods of extracting material from a body of liquid, such as, for example, extracting algae or surface contaminants from a body of water. Some embodiments described below are described in the context of selectively extracting strands of *Aphanizomenon flos-aquae* (AFA) from a body of water, although these embodiments (and this disclosure) are not limited to merely this context. For example, some embodiments can be used to extract oil from a body of water, e.g., which may be present after an oil spill into the body of water.

The following makes reference to the accompanying drawings which form a part hereof, wherein like numerals designate like parts throughout. The drawings illustrate specific embodiments, but other embodiments may be formed and structural changes may be made without departing from the intended scope of this disclosure. Directions and references (e.g., up, down, top, bottom, left, right, rearward, forward, heelward, etc.) may be used to facilitate discussion of the drawings but are not intended to be limiting. For example, certain terms may be used such as "up," "down,", "upper," "lower," "horizontal," "vertical," "left," "right," and the like. These terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" as well as "and" and "or."

Accordingly, the following detailed description shall not be construed in a limiting sense, and those of ordinary skill will appreciate the wide variety of materials and/or contaminants that can be extracted from a body of liquid using the apparatus and methods described herein.

Figure 1:
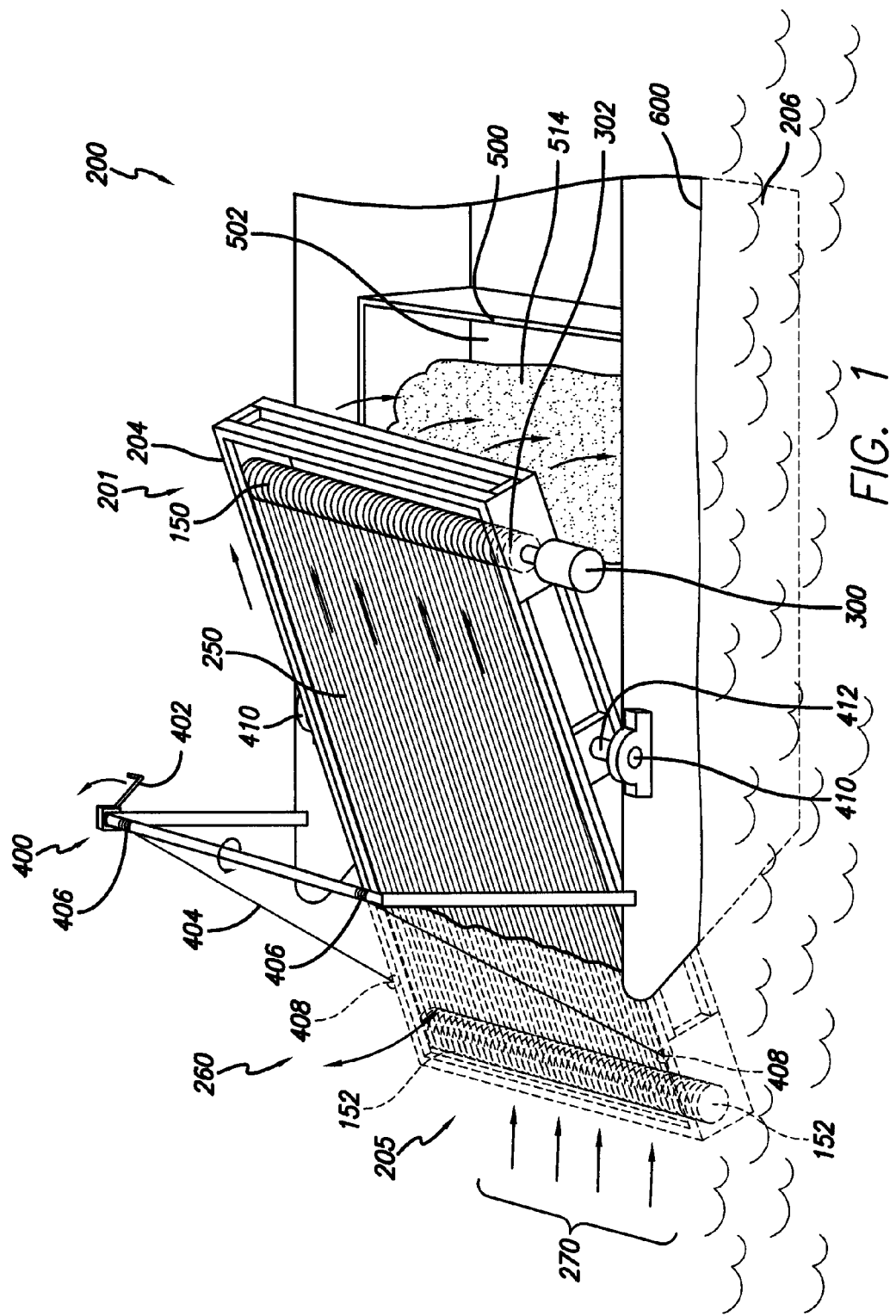
FIG. 1 illustrates an isometric view of an exemplary apparatus for extracting material from a body of liquid. The apparatus includes a conveyor portion with a transport member extending between two conveyor drums and a frame supported by a platform.

For example, FIG. 1 illustrates an isometric view of one embodiment of an apparatus for extracting material from a body of liquid. The embodiment 200 illustrated in FIG. 1 can be used as a harvester for extracting biomass, such as AFA, from a body of water. The embodiment 200 includes a conveyor portion 201 and a frame 204 supported by a platform 206. In general, such a conveyor portion 201 includes at least one transport member 250 spanning a distance between two conveyor drums 150, 152. As used herein, a "drum" means a member having a substantially cylindrical outer surface around at least a portion of which a transport member can pass. A conveyor drum can drive or be driven by the transport member 250, as by frictional engagement with the transport member. A conveyor drum that drives the transport member is referred to herein as a drive-drum 150. A conveyor drum that does not drive the transport member is referred to herein as an idler-drum 152. Typically, a conveyor drum is adapted to rotate about a longitudinal axis as one or more transport members pass over a surface of the conveyor drum. Nonetheless, it is possible for a conveyor drum to remain static in certain cases, e.g., an idler-drum can remain static.

Transport Members

Referring to FIG. 1, a transport member 250 for extracting material from the body of liquid 600 is shown. Such material can be deposited in a collection area (such as a bin 500 having extracted material 514 therein). The transport member 250 comprises a continuous loop passing at least partially round a portion of each of the drive-drum 150 and idler-drum 152. The transport member 250 can be formed by winding a line 130, e.g., monofilament as conventionally used for fishing line, around the conveyor drums 150, 152 and joining opposing ends of the line 130 (see e.g., FIGS. 2A, 2C and 2E) to each other, as by knotting, melting, splicing or other known line-end joining techniques.

A line used to form a transport member can be selected such that a material to be extracted from the body of liquid 600 sufficiently adheres to the transport member. As used herein, "sufficiently adheres" means that, as a transport member travels through and out of a body of liquid, a material interacts with the transport member such that at least some of the material is carried out of the body of liquid by the transport member. Colonies of AFA sufficiently adhere to monofilament. Consequently, a transport member 250 can have one or more segments of monofilament when a harvester is to be used to extract commercially significant volumes of AFA from a body of water. In at least one operable embodiment, transport members have been formed using Eagle Claw® monofilament line (clear). In other embodiments, string conventionally used for stringing racquets (e.g., tennis racquets) has been used. Some lines comprise surface treatments, for instance, Teflon coating.

Figure 2A:
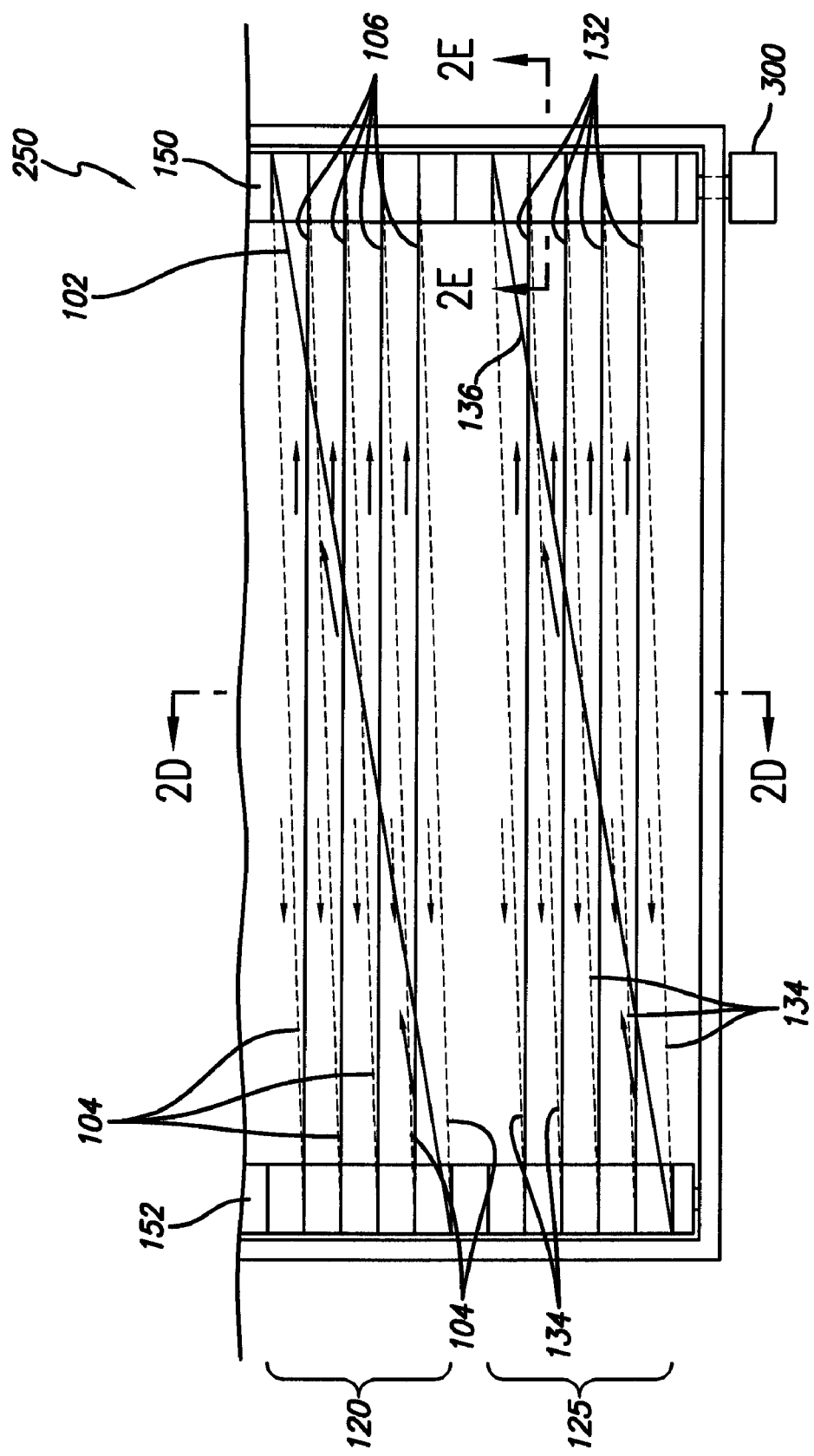
FIG. 2A illustrates a partial plan view from above the conveyor portion and frame of FIG. 1.
Figure 2B:
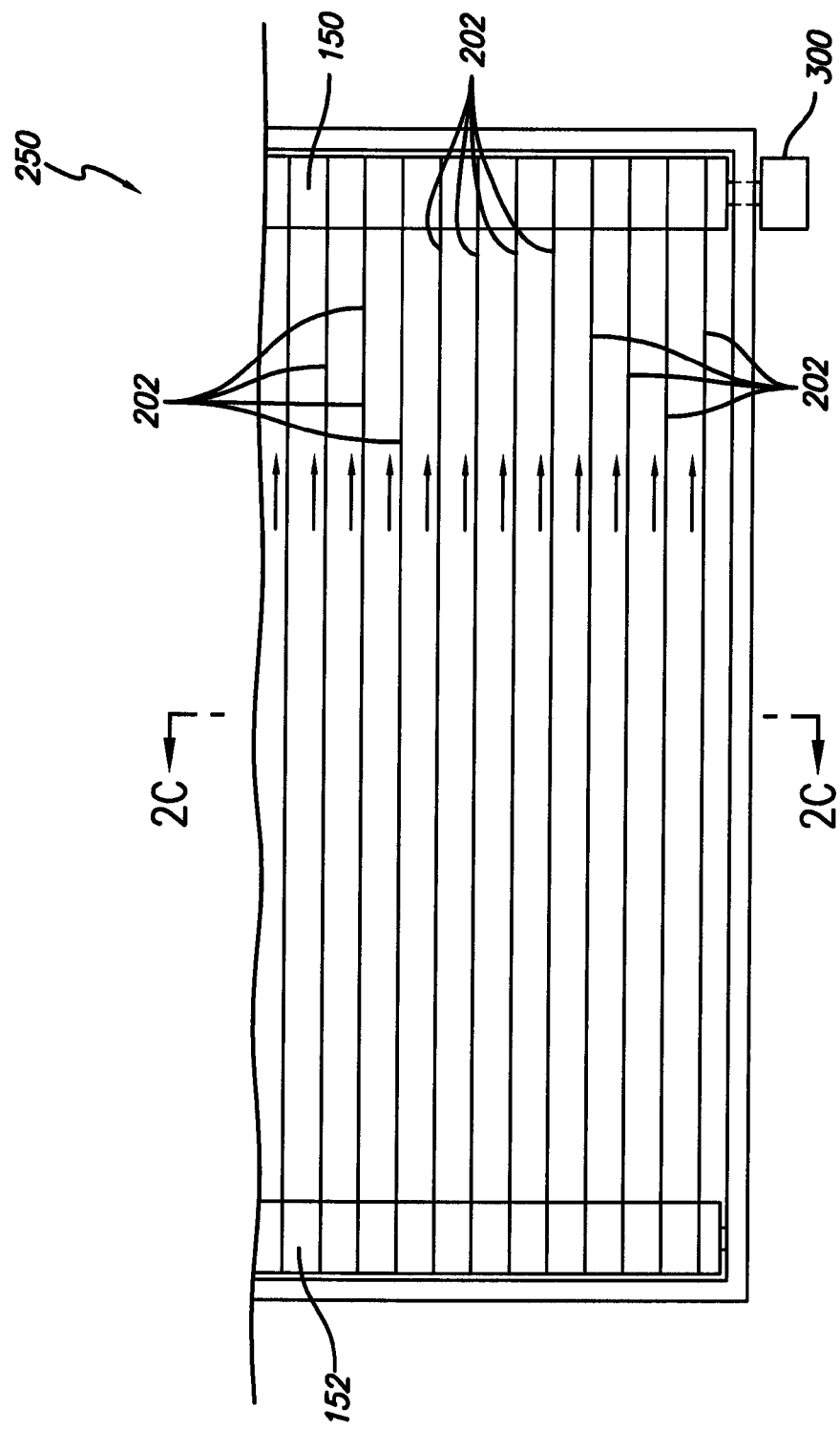
FIG. 2B illustrates a partial plan view from above an alternative embodiment of a conveyor portion and the frame of FIG. 1.

A continuous loop forming a transport member can comprise a single winding 202 (as shown in FIGS. 2B and 2C) or a plurality of windings (e.g., a "serpentine winding") 120, 125 (as shown in FIGS. 2A and 2D). In some embodiments of a single winding 202, the upper portion 132 and the lower portion 134 of the continuous loop are substantially parallel and coplanar (as shown for example in FIGS. 2C and 2E). A single winding 202 can be formed by winding a line around the conveyor drums 150, 152 once, and joining opposing ends of the line 130.

In contrast to a single winding, a serpentine winding 120, 125 can be formed by spirally winding a line 130 around the conveyor drums 150, 152 more than once before joining opposing ends of the line 130. Such a continuous loop is not substantially coplanar over its entire length (as shown in FIGS. 2D and 2E), though some segments extending between the conveyor drums 150, 152 can be substantially parallel to each other, e.g., segments 106 and 132, and 104 and 134. Opposing ends of a spirally wound line can be joined to each other to close a continuous loop 120, 125 by laying opposing end portions of the line transversely relative to the parallel segments 106, 104 and 132, 134 to form at least one cross-segment 102, 136 extending across the parallel segments 106, 104 and 132, 134.

In each of these transport member embodiments, the respective windings 120, 125, 202 are configured such that each transport member 250 can continuously travel through an orbit. A transport member (e.g., configured as a single winding or a serpentine winding) that continuously travels through an orbit provides, among many advantages, the ability to continuously extract a material from a body of liquid. For example, as a portion of the transport member 250 engages the material, a following "fresh" portion of the transport member free (or substantially free) of material is exposed to (e.g., made available for engaging) remaining material in the body of liquid.

A transport member having more than one continuous loop can provide enhanced reliability as compared to a transport member having only one continuous loop. For example, a transport member having a plurality of continuous loops can remain at least partially operable in the event one of the continuous loops breaks, as from a collision with floating debris.

As used herein, "selective extraction" means removal of one or more desired materials from a region of a body of liquid to the substantial exclusion of one or more undesirable materials when the one or more undesirable materials are present in the region of the body of liquid from which the desired materials are being removed.

Spacing of adjacent portions of a transport member can be controlled to facilitate selective extraction of a material. For example, if parallel segments 104, 106, 132, 134 (FIGS. 2A and 2D), and/or parallel windings 202 (FIGS. 2B and 2C), that form extraction portions of a transport member 250 are placed too closely together, "bridging" of extracted material between adjacent segments 104, 106, 132, 134 (and/or windings 202) can occur, possibly leading to the extraction of one or more undesirable materials in addition to or to the exclusion of a desired material. Increased spacing between portions of a transport member tends to decrease such bridging and can improve selective extraction of some materials, particularly some blue-green algae such as AFA. On the other hand, maintaining a close spacing between adjacent segments and/or windings can increase the number of extraction portions 132 available to interact with a material to be extracted and thus can increase overall rates of material extraction.

To selectively extract AFA (e.g., AFA in the presence of some undesirable algae species or zooplankton) extraction portions of a transport member can be spaced greater than about three-eighths-of-an-inch apart, such as between about three-eighths-of-an-inch and about one-inch, with about one-half-of-an-inch spacing between extraction portions (e.g., segments 132) being but one example.

Varying the travel time of the extracted material on a transport member can vary the extent to which liquid is eliminated from the extracted material, allowing an operator to at least partially tune the rate of material extraction to a level resulting in a liquid content in the extracted material being compatible with secondary-processing parameters. FIG. 3 shows part of a line 162 having extracted material 160 adhered to the line. A speed of the transport member 250 can be varied by adjusting a drive-speed of the drive 300, e.g., by varying a DC current supplied to a DC motor, (see description below) to vary the time the extracted material 160 (e.g., AFA strands) remains on the strand 130 travelling from the body of liquid 600 to a discharge end of the conveyor portion 201. Also, a travel distance from the body of liquid to the discharge end can be varied (e.g, by varying the depth to which the submersible end is submerged) to vary the travel time of the extracted material 160.

In some instances, secondary processing of extracted material can be enhanced by removing liquid from extracted material prior to secondary processing. Thus, travel time can be varied to reduce liquid content in the extracted material. For example, in one embodiment using a transport member constructed of monofilament, selectively extracted AFA solids content varied between about 5% and about 8.5% based in part on changes of transport member 250 speed and travel distance. For example, in at least one embodiment, the transport member 250 can travel between about thirty feet-per-minute and about eighty feet-per-minute, and the travel distance can be up to about ten feet. Of course, other embodiments can provide other higher and/or lower speeds, and greater and/or shorter travel distances.

Conveyor Drums and Frame

In the illustrated embodiments, the conveyor drums 150, 152 are respectively positioned adjacent opposing ends of the frame 204. For example, the drive-drum conveyor drum 150 can be located adjacent one end of the frame 204 and the idler-drum conveyor drum 152 can be located adjacent another end 205 of the frame 204.

In the embodiment shown in FIG. 1, the idler-drum 152 happens to be located adjacent a submersible end of the frame 204. However, in some embodiments, the drive-drum 150 is located adjacent the submersible end. As more fully described below, submersing at least a portion of the transport member 250 allows a flow 270 (and any material suspended therein) to pass over the transport member 250.

The frame 204 can have mounted thereto a drive 300 configured to drive the drive-drum 150 in rotation. The drive 300 can be powered conventionally, such as, for example, by an electric motor, a combustion engine, a hydraulic system, and/or a "power-take-off" transmission coupled to a power source located on the platform. In some embodiments, the drive-drum 150 has a drive-shaft 302 extending therethrough which a drive can engage to drive the drive drum. See, e.g., FIG. 2E. In the embodiment shown in FIG. 2E, the drive-shaft 302 is driven by the drive 300 and is fixedly attached, as by bonding, to the drive-drum 150.

With reference again to FIGS. 2A, 2B and 2E, the drive-drum 150 can frictionally engage the transport member 250 such that as the drive-drum 150 rotates, the transport member 250 travels along an orbit, e.g., similar to a belt driven by a pulley. In some embodiments, the transport member 250 also frictionally engages the idler-drum 152. In these embodiments, the transport member 250 can drive the idler-drum as the transport member 250 is itself driven by the drive-drum 150. However, an idler-drum can alternatively be adapted to remain static. In some embodiments, a tensioning idler (not shown) can be provided to urge against a portion of the transport member 250 for maintaining tension in the transport member. In other embodiments, a conveyor drum can be outwardly movable for increasing tension in the transport member. Maintaining tension in the transport member 250 can be helpful in maintaining a frictional engagement between the transport member and the conveyor drums.

In one operable embodiment, an outer-diameter of a drive-drum is approximately six-inches and an outer-diameter of an idler-drum is approximately two-and-a-half-inches. Applicants discovered to their surprise that a comparatively small submerged drum, e.g., a cylindrical idler-drum, can be used to increase rates of material extraction. For example, since a flow of liquid over the submerged and smaller drum desirably carries at least some material to be extracted in suspension, relatively more suspended material will by-pass larger submerged drums than smaller submerged drums e.g., as streamlines of the flow diverge in passing over the submerged drum.

Figure 5:
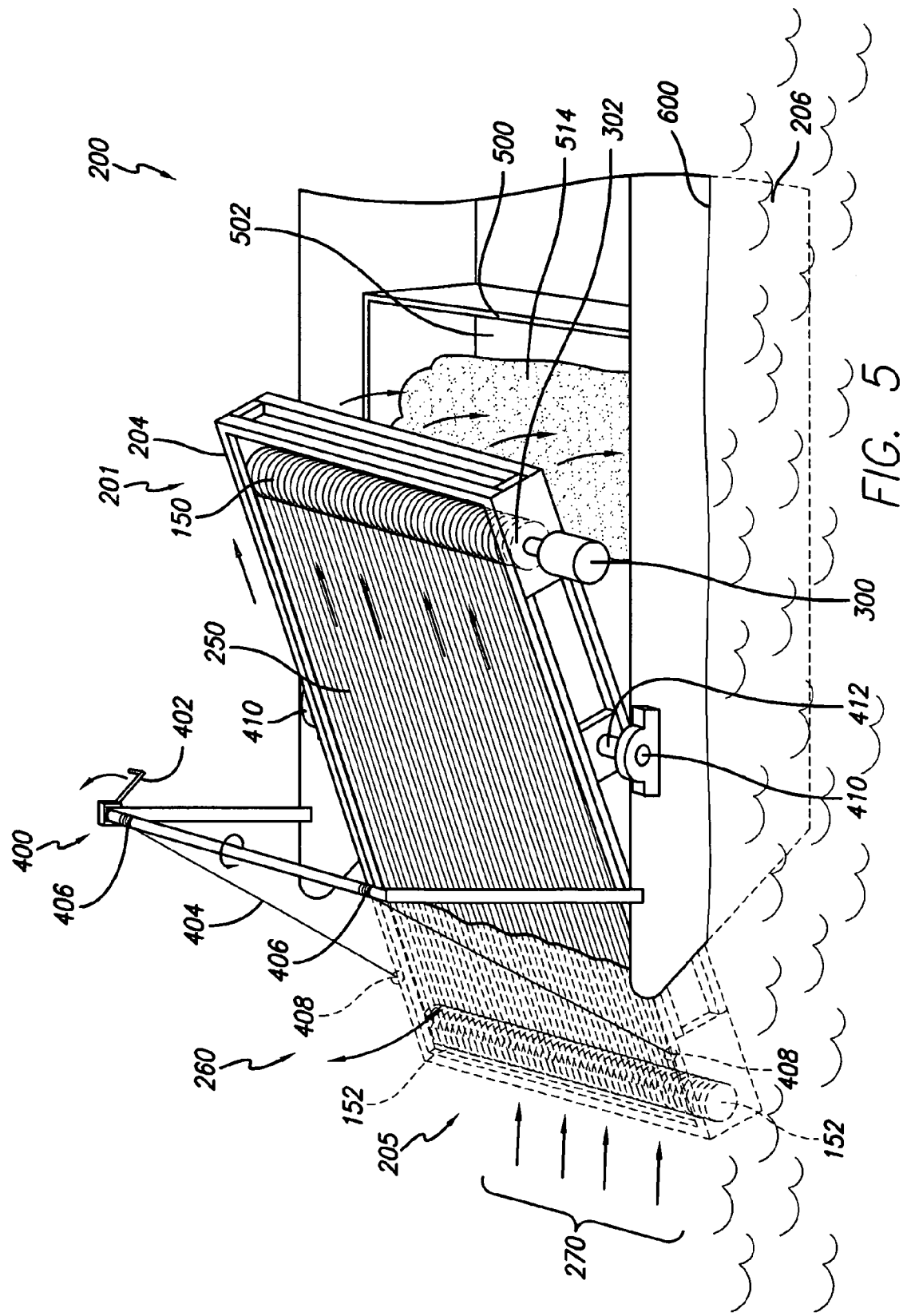
FIG. 5 illustrates an isometric view of an exemplary apparatus for extracting material from a body of liquid where the conveyor drums have different diameters.

A relatively larger drum, such as in this instance a drive-drum, can provide a sufficient spacing between upper and lower portions of a transport member to eliminate (or at least substantially eliminate) bridging between the upper and lower portions as one portion sags under loading with extracted material. In other embodiments, a characteristic length of the drive-drum is about twice a characteristic length of the idler-drum. For example, the drive-drum's characteristic length could be a diameter, and the idler drum's characteristic length could be another diameter. In this example, the drive-drum's diameter could be about twice the diameter of the idler drum, such as, for example, ranging from about one-and-a-half times to about three times the diameter of the idler drum. This is shown in FIG. 5 where the drive drum 150 has a larger diameter than the idler drum 152. In some embodiments, the idler drum can be statically positioned and comprise a hydrofoil or a body having a hydrofoil-like cross-section.

As shown by FIG. 4, the cylindrical exterior surface of a conveyor drum 155 (e.g., a drive-drum 150, or an idler-drum 152) can define one or more grooves 181 (e.g., grooves 180 in FIG. 2C and FIG. 2D). Placing a portion of a transport member in one or more of the grooves can improve frictional engagement between the conveyor drum and the transport member. Moreover, positioning a portion of the transport member within a groove can assist in maintaining the transport member in an operable position, as by preventing one or more windings of the transport member from moving to and fro along the surface of the conveyor drum as the transport member moves through its respective orbit.

In some embodiments, a plurality of spacers or a "comb" (not shown) can be used to maintain spacing between adjacent loops and/or windings. For example, one or more rods being fixed relative to the frame 204 and extending perpendicularly to a plane of the transport member 250 (such as a plane defined by a "top" course of segments 132, such as segments 106) can be placed between adjacent segments of a transport member to guide the individual portions as they engage (or disengage) a conveyor drum 150, 152. Such a spacer can be used in combination with a conveyor drum having a circumferentially extending groove as described above.

Scraping Members

FIG. 2E illustrates a scraping member 170 that urges against at least a portion of a line 130 and a corresponding conveyor drum. As the coated line 162 engages the conveyor drum and passes by the scraping member 170, at least a portion of material 160 adhered to the transport member 250 is separated from the transport member, as illustrated by the partially removed material 163. Such separated material 164 can then be deposited, as by falling under the force of gravity, in a collection area 502 or bin (e.g., the bin 500 of FIG. 1 containing a mass 514 of extracted material).

The illustrated scraping member 170 has a pliable and substantially planar body before being installed as shown in FIG. 2E. During installation, the body of the scraping member 170 can be positioned to extend substantially radially of the drive-drum 150 and parallel thereto. When installed, a body of this type can be bent as shown such that the scraping member 170 urges against the coated line 162. In one operable embodiment, the body is formed of a silicon rubber having a hardness between about 40-durometer and about 50-durometer.

When in motion, the coated line 162 slides against the scraping member 170 to remove at least of portion of extracted material 160 (e.g., partially removed material 163). In some instances, particularly harvesting AFA, such sliding against the scraping member removes a significant portion of any extracted material 160 adhered to the transport member 250.

As shown in FIG. 2E, the body of the scraping member 170 can be disposed between clamping members 172, 174, such as metal or plastic strips. The clamping members 172, 174 can be tightened toward each other using one or more nut-and-bolt assemblies 176 to compress the scraping member 170 between the clamping members 172, 174.

In FIG. 2E, a lower portion 134 of the transport member 250 leaves the conveyor drum/scraping member region substantially free of extracted material. This "fresh" portion of the transport member is ready to interact with and extract additional material from the body of liquid.

Platforms

As shown in FIG. 1 and noted above, apparatus for extracting material from a body of liquid 600 can be supported by a platform 206. In some embodiments, the apparatus 200 (e.g., a harvester) can be mounted to a buoyant platform, such as a boat, and operated away from shore. In other embodiments, a harvester can be mounted to a stationary platform or even a shore secured pier or dock.

During operation, a flow 270 can carry material over the submerged portion 205 of the transport member 250. Such a flow 270 can be naturally occurring (as for example currents driven by wind, tide, or open water currents) or pumped (such as, for example, a pumped irrigation flow). Alternatively, such a flow 270 can be induced by moving the platform 206 across the body of liquid 600, such as by motoring a boat with a trolling motor. As the flow 270 carries material past the windings of the transport member 250, some material sufficiently adheres to and coats at least a portion of the transport member 250. As the transport member 250 travels through its orbit, the coated line 162 extracts the material 160.

In the embodiment shown in FIG. 1, the platform 206 has mounted thereto a device 400 for raising and lowering a submersible end (e.g., the end 205) of the frame 204. The device 400 allows the submersible end to be lowered below a surface of a body of liquid 600. In the illustrated embodiment, supporting shafts 412 extend outwardly of the frame 204 to engage the fulcrums 410. The frame 204 can pivot about the fulcrums relative to the platform 206.

As noted above, the submersible end 205 can be selectively placed relative to the surface of the body of liquid 600 (e.g., at the surface or submerged). In many embodiments, the submersible end can be lowered to a depth of about six feet below the surface (e.g., up to about eight feet). An operator will often choose the depth based, in part, on the depth of the highest concentrations of material to be extracted (e.g., the depth of a high concentration of AFA might be up to about eight feet deep). In other applications, such as cleaning an oil spill from water, the submersible end can be placed substantially at the surface of the body of liquid.

In the illustrated embodiment, the device 400 has a shaft forming a pair of winches 406 and engaging a rotatable handle 401. The handle 401 can turn the shaft for winding or unwinding a line (e.g., a cable, rope or other tensioning line) about the winches 406. Tension members 404 are attached to the frame 204 at attachment points 408. As the winches 406 rotate, the tension members 404 wind or unwind (according to the direction of rotation of the shaft) about the winches, causing the submersible end 205 to raise or lower and the frame 204 to pivot about the fulcrums 410.

Although a pair of manual winches is illustrated, raising and lowering an end of the frame (or the entire frame) can be accomplished using many devices. For example, the plurality of illustrated winches can be replaced by a single winch. The manually driven winches of FIG. 1 can be replaced by one or more electric winches. Winches can be altogether absent, and one or more hydraulic systems can be used to raise and lower the entire frame, or one end thereof. Such hydraulic systems can be driven manually, electrically and/or through a power-take-off from an engine, such as a gasoline- or diesel-powered engine used to propel a boat to which the frame 204 is mounted.

Platforms 206 can include storage for extracted materials, as well as post-extraction processing equipment. For example, storage containers, such as the bin 500, can be chilled and insulated to maintain extracted material, such as AFA, at a temperature (e.g., about 36-degrees Fahrenheit) until removed for secondary processing (e.g., dried as for consumption, frozen for long-term storage). In some instances, extracted material undergoes secondary processing prior to being stored. Some platforms include additional secondary-processing equipment, such as equipment for further dewatering extracted material before storing the material.

Exemplary Methods

Methods of extracting material from a body of liquid will now be described. Such methods can be used, for example, to extract surface contaminants, such as oil from a body of water, and to harvest a blue-green algae (e.g., AFA) from a colony of blue-green algae suspended below a surface of a body of water. Examples of a body of water include a lake, bay, open ocean, lagoon, irrigation canals and any other selected body of water, or waterway or stream (regardless of whether such waterway is navigable).

The apparatus 200 can be rigged, e.g., have one or more transport members 250 installed as described above, such as by winding monofilament about a pair of conveyor drums, either at a harvesting site or off-site. The apparatus 200 and its corresponding platform 206 can be located (e.g., moved into position) for extracting a material from the body of liquid 600. At least a portion (e.g., the submersible end) of the transport member 250 can be positioned in a region of the body of liquid 600 having the material to be extracted. For example, a colony of AFA might be located about six feet below a surface of water. In this instance, the submersible end of a harvester can be submerged to a corresponding depth of about six feet.

A flow 270 past and/or over the transport member 250 (e.g., a stream in an irrigation canal) can put the transport member 250 and the material to be extracted in contact with each other. Such contact provides an opportunity for the material to sufficiently adhere to the transport member 250 as the transport member travels through and passes from the liquid. In mobile-platform embodiments, the platform can be moved, as by trolling (e.g., slow, continuous repositioning), to induce the flow 270 past the transport member 250. Mobile platform embodiments can be used for extracting material from a body of water with few or slow-moving currents, such as ponds and some lakes. For example, a boat supporting a harvesting apparatus can motor to a location having a colony of AFA biomass, the transport member 250 can be partially submerged and the boat can motor at a trolling speed (e.g., about 2 knots).

Alternatively, a platform 206 (e.g., a fixed-platform embodiment) can be positioned in a current that provides the flow 270. For example, in harvesting AFA a buoyant platform can be placed proximate a favorable, e.g., a lee or windward, shore and a naturally occurring current can carry suspended colonies of AFA past and/or over a submerged transport member 250.

The speed of the transport member 250 can be tuned to vary rates of extraction (and thus liquid content) as noted above.

Extracted material 160 can be transported by the transport member 250 until removed, such as by a scraping member 170, centrifugal and/or centripetal acceleration, etc. Extracted material 164 removed from the transport member 250 can be temporarily placed or stored in a bin, as illustrated by FIG. 1, before undergoing secondary processing. Alternatively, extracted material can undergo secondary processing, such as a dewatering process, before being stored or processed further (e.g., for consumption in the case of AFA).

Harvesting apparatus and methods as described above can be used to selectively extract materials from a body of liquid, such as, for example, extracting algae or surface contaminants from a body of liquid. As but one example, AFA can be selectively extracted from a colony of AFA suspended in a body of water and interspersed with undesirable species, such as other algae species or zooplankton that would ordinarily lead to undesirable levels of toxins, such as microcystin. In addition, materials can be selectively extracted without inadvertently extracting or harming fish.

By selectively extracting material, one will no longer need to wait until a material to be extracted from a body of liquid is naturally isolated from other materials or aquatic life. As a consequence, material extraction during periods unavailable using conventional apparatus and methods is possible. In addition, at least in the case of selectively harvesting AFA, the AFA can be at least partially dewatered during the extraction process (e.g., while being carried on the transport member), thereby reducing post-harvest processing time.

In view of the many possible embodiments to which the principles of the disclosed innovations can be applied, it should be recognized that the above-described embodiments are only preferred examples and should not be taken as limiting the scope of what is claimed. Rather, the scope of what is claimed is set forth in the following claims. We therefore claim as our invention all that comes within the scope and spirit of these claims.

We claim:

1. A harvester for selectively harvesting biomass from a body of water, the apparatus comprising:
    a frame having a drive-drum end and an idler-drum end;
    a drive-drum located adjacent the drive-drum end;
    an idler-drum located adjacent the idler-drum end;
    a drive for driving the drive-drum in rotation; and
    at least one transport member comprising at least one length of monofilament having opposing ends, wherein the opposing ends join each other to form a continuous loop around and frictionally engaging the drive-drum and the idler-drum wherein the at least one continuous loop comprises a serpentine winding having a plurality of substantially parallel segments extending between the drive-drum and the idler-drum, and at least one cross-segment extending transverse to the parallel segments.

2. The harvester of claim 1, further comprising a scraping member positioned to urge against the at least one transport member, such that, when in motion, at least a portion of the transport member slides past the scraping member for removing biomass sufficiently adhered to the transport member.

3. The harvester of claim 2, wherein the frame is configured to be pivotably mounted to a platform such that when the frame is pivotably mounted to the platform, the idler-drum is at least partially submersible in the body of water by pivoting the frame.

4. The harvester of claim 2, wherein the drive-drum defines at least one exterior, circumferentially-extending groove for aligning the at least one transport member.

5. The harvester of claim 2, wherein the at least one continuous loop comprises a single winding.

6. The harvester of claim 1, wherein the diameter of the drive drum larger than the diameter of the idler drum.

7. A method of extracting a material from a body of liquid, the method comprising:
    at least partially submerging in a body of liquid a portion of the harvester of claim 1; and
    passing the submerged portion of the harvester through the body of liquid;
    lifting the submerged portion of the harvester from the body of liquid; and
    scraping the transport member with a scraping member so as to remove any material adhered thereto.

8. The method of claim 7, wherein the act of passing the submerged portion of the harvester through a concentration of the material comprises moving the submerged portion of the transport member through the body of liquid.

9. The method of claim 8, wherein the act of passing the submerged portion of the transport member through a concentration of the material comprises positioning the submerged portion of the transport member in a current within the body of liquid and allowing the current to pass the submerged portion of the transport member.

10. The method of claim 9, wherein the act of at least partially submerging at least a portion of a transport member comprises the act of submerging at least a portion of the transport member to a depth of up to about eight feet below a free surface of the body of liquid.

11. The method of claim 8, wherein the material comprises a blue-green algae.

12. The method of claim 11, wherein the blue-green algae comprises *Aphanizomenon flos aquae*.

* * * * *